TAPE TRANSPORT DRIVE MEANS

Filed Dec. 20, 1966

INVENTOR
Langdon H. Fulton
John V. Regan
Attorney

United States Patent Office 3,396,890 Patented Aug. 13, 1968

3,396,890

TAPE TRANSPORT DRIVE MEANS

Langdon H. Fulton, Wynnewood, Pa., assignor to Radio Corporation of America, a corporation of Delaware Filed Dec. 20, 1966, Ser. No. 603,274
9 Claims. (Cl. 226—177)

This invention relates to tape transports. More specifically, the present invention relates to capstan drive apparatus for a tape transport.

High speed tape transports, particularly the so-called "digital" transports, require a tape drive system capable of quickly starting and stopping the recording tape, i.e., fast "start-stop." In order to obtain such an operating characteristic, the prior art transports have incorporated devices such as quick-acting pinch rollers, tape braking devices and vacuum tape drives. These prior art "solutions" to the fast "start-stop" problem suffer from an inherent complexity requiring highly sophisticated servomechanisms. The present invention is directed toward providing a tape transport having a fast "start-stop" mode of operation while avoiding the mechanical shortcomings of the prior art.

An object of the present invention is to provide an improved tape drive means.

Another object of the present invention is to provide a tape drive means having a fast "start-stop" mode of operation.

A further object of the present invention is to provide an improved fast start-stop tape transport using a friction control apparatus for a continuously rotating tape drive capstan.

In accomplishing these and other objects, there has been provided, in accordance with the present invention, a tape transport using a continuously rotating tape capstan. The capstan is a composite structure having an outer tape-contacting cylindrical shell and an inner piezoelectric drive means for selectively producing a radially directed mechanical oscillation of the outer shell. This oscillation produces a so-called "squeeze film bearing" between the outer surface of the shell and the tape to effectively separate the tape from the shell. A pinch means is arranged to apply a "normal" force to the tape against the outer capstan shell.

A better understanding of the present invention may be had when the following detailed description is read in connection with the accompanying drawings, in which.

Figures 1, 2:
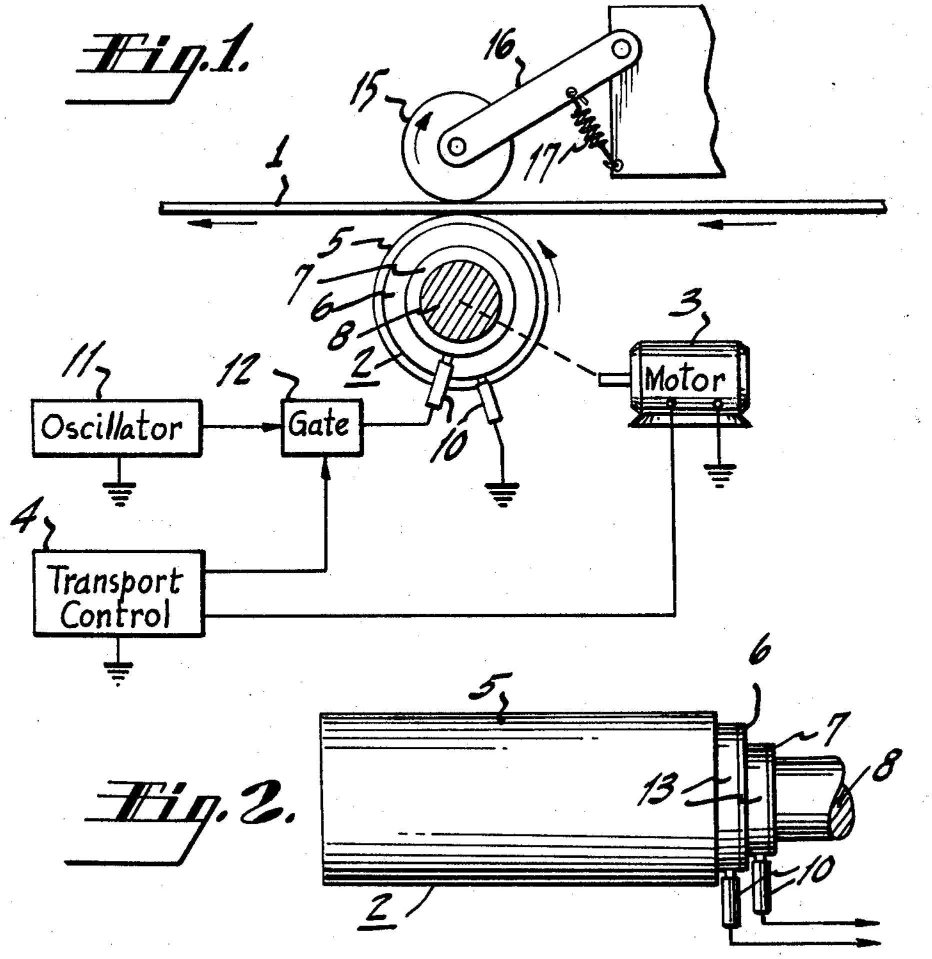
FIGURE 1 is a pictorial illustration of the tape transport drive apparatus embodying the present invention.
FIGURE 2 is a pictorial representation of a composite drive capstan suitable for use with the apparatus shown in FIGURE 1.

Referring to FIGURE 1 in more detail, there is shown a tape drive apparatus for longitudinally driving a tape 1. The tape 1 may be arranged to any suitable tape transport having a supply reel, a storage reel, a reading head, a recording head, etc., the details of which do not form a part of this invention and, accordingly, are not specifically described in this disclosure. A tape capstan 2 is arranged to be selectively driven, e.g., continuously, by a motor 3 energized from a transport control means 4. An outer cylindrical shell 5 of the capstan 2 is arranged as a tape driving surface supporting the tape 1.

Beneath the outer shell 5 of the capstan 2 is an attached supporting structure comprising a second cylindrical shell 6 supporting the outer shell 5. This second shell 6 may be made of any suitable piezoelectric transducer material which exhibits appropriate dimension changing properties under an applied electric field, e.g., barium titanate. In order to provide electrical connections to the second shell 6, the inner and outer surfaces thereof may each be plated with a separate electrically conductive film forming a sandwich structure with the piezoelectric material therebetween. The second transducer shell 6, in turn, is supported on an inner third shell 7 arranged to support the second transducer shell 6 while providing minimum damping, or absorption, of the mechanical oscillations thereof. Finally, the third shell 7 is supported on a capstan drive shaft 8 arranged to be connected to the drive motor 3.

A pair of brush means 10 are arranged to provide electrical connections to the conductive films on the piezoelectric material 6. An oscillator 11 is arranged to supply an energizing signal to the brushes 10 through a gate circuit 12. The gate 12 is selectively controlled by the tape transport control 4.

The capstan 2 is shown in a side view in FIGURE 2. The conductive films 13 may be extended out of the capstan structure to provide a contacting surface for the brushes 10. A pinch roller 15 is rotatably mounted on a pivoted arm 16 on the other side of the tape 1 from the capstan 2. The arm 16 is biased by a spring 17 to press the roller 15 against the tape 1 with a predetermined force.

In operation, the present invention is effective to selectively apply a driving motion to the tape 1. The transducer element 6 is driven in a self-resonant arrangement with the oscillator 11 to produce a high frequency expansion and contraction, or oscillation, of the transducer element 6. Preferably, this oscillation is arranged, by means of providing a suitable self-resonant circuit with the transducer to be in a so-called "circumferential mode." The oscillation of the transducer element 6 is transmitted to the contacting outer cylinder 5 to produce a "squeeze film effect" between the outer surface of the cylinder 5 and the adjacent surface of the tape 1. The theory of the squeeze film effect giving rise to "squeeze film bearings" is discussed in an article by E. O. J. Salbu entitled "Compressible Squeeze Films and Squeeze Bearings" in the Journal of Basic Engineering, Transactions ASME, Series D, vol. 86, pp. 355 to 364 in June 1964. Further discussion of the theorectical aspects of the squeeze film effect, accordingly, is omitted from the present disclosure. The supporting cylindrical element 7 for the transducer 6 is arranged to be a medium providing rigid support without materially absorbing and thereby dissipating the mechanical oscillatory energy of the transducer shell 6. In other words, the material for support element 7 should have a low acoustical impedance, i.e. a suitable material is rigid polyurethane foam.

The spring bias of the pinch roller 15 is arranged to produce a "normal" force applied by the tape 1 against the outer shell 5. This "normal" force is effective to produce a frictional force by the shell 5 for driving the tape 1 when the transducer element 6 is unenergized. In other words, when the transducer 6 is oscillating, the squeeze film bearing generated at the outer surface of the cylinder 5 is effective to substantially eliminate frictional contact between the tape 1 and the cylinder 5. Since the driving of the tape 1 arises from the normal force from the spring biased pinch roller 15 acting on a moving frictional surface, the tape 1 is not driven during the time that the transducer 6 is oscillating.

The capstan 2 is continuously rotated by the motor 3 under control of the transport control 4, however, a longitudinal motion is imparted to the tape 1 only when the transducer 6 is turned off. Since the tape 1 is ordinarily held in a stationary position by other tape handling elements of the tape transport previously mentioned, it may be seen that the capstan 2 is effective to move the tape 1 during precise increments of time encompassing the period of oscillation of the transducer 6. Thus, the tape 1 is started and stopped in a high speed fashion by means of the virtually instantaneous action of the transducer 6.

In FIGURE 2, there is shown a modification of the tape drive structure shown in FIGURE 1. In this arrangement, the "normal" force applying means is arranged as a "pinch pad" 20. The pad 20 is supported on a pivoted arm 21 biased by a spring 22. The tape contacting surface of the pad 20 is a disc 23. Behind the disc 23 is a piezoelectric element 24. The element 24, in turn, is supported by a resilient disc 25 attached to a support block 26 pivotally mounted on the arm 21. Electrical leads 27 are arranged to provide electrical connections to the transducer 24. An oscillator 30 is arranged to provide energizing signals through a gate circuit 31 to the pad transducer element 24. The gate 31 and the gate 12 for the capstan 2 are selectively operated by the transport control 33.

Other configurations of the pinch roller assembly may be used without departing from the scope of the present invention. For example, in order to increase the area contacted in the embodiment of FIGURE 1, the roller 15 may be replaced by a belt (not shown) suspended between two rollers with the assembly being carried by a spring-loaded arm. The belt would be "wrapped" around the capstan 2 to the degree necessary to obtain the desired contact area. Similarly, the disc 23 of the pinch pad 20 of FIGURE 3 may be formed with a tape contacting surface mating with the capstan 2 to provide a greater area of contact. These variations in structure may be effective to decrease the squeeze-film bearing pressure needed to balance the "normal" force.

Figure 3:
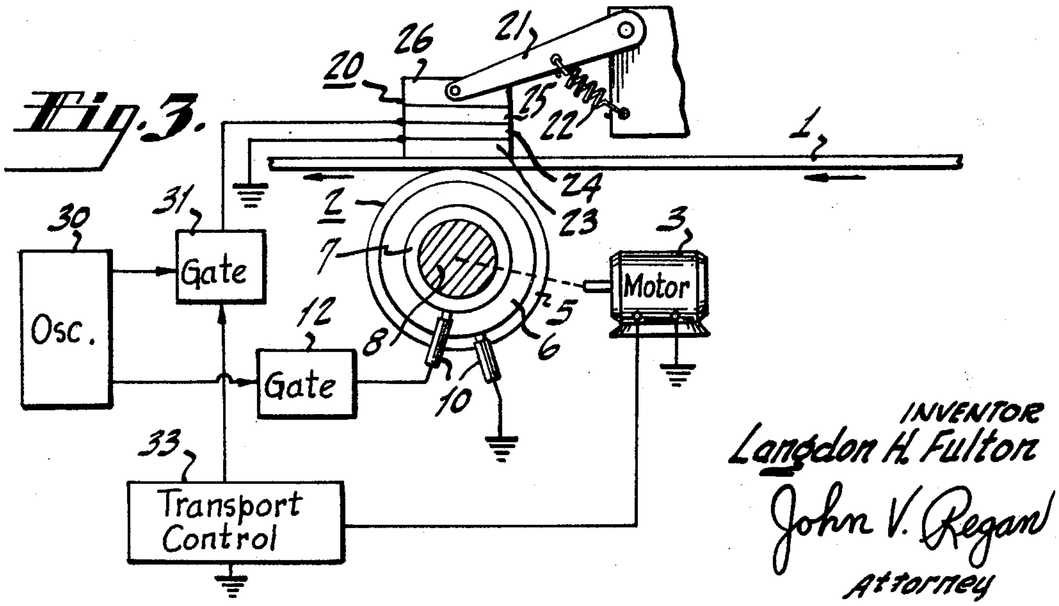
FIGURE 3 is a pictorial illustration of a modified form of the tape drive apparatus shown in FIGURE 1.

In the embodiment of the invention shown in FIGURE 3, several modes of operation are feasible. For example, the transducers in the capstan 2 and pad 20 may be operated concurrently to generate squeeze film bearings on both sides of the tape 1. The transducer 24 is oscillated in a self-resonant manner to produce a squeeze film bearing between the attached disc 23 and the tape 1. Such a mode of operation would completely isolate the tape 1 from the drive assembly when it was desired not to drive the tape 1 by the capstan 2; e.g., when the tape is driven in reverse by counter-rotating capstan. The driving of the tape 1 would be effected by de-energizing the capstan transducers 6 by means of the gate 12. On the other hand, the pad 20 may be used alone to control the stopping of the tape 1 by energizing the transducer 6 while the transducer 24 is de-energized to produce a frictional force between the pad 20 and the tape 1. Thus, the squeeze film bearings generated by the capstan 2 and the pad 20 are uned to control effect of the "normal" force by altering the coefficient of friction between the operative elements.

Accordingly, it may be seen that there has been presented, in accordance with the present invention, a fast start-stop drive apparatus having utility in a tape transport.

What is claimed is:

1. A tape drive assembly comprising a capstan having an outer cylindrical shell, a transducer means attached to the interior of said shell and arranged to impart a physical oscillation thereto, drive means arranged to rotate said capstan, and a tape pinch means arranged to apply a normal force to an outside surface of said shell.

2. A tape drive assembly as set forth in claim 1, wherein said transducer means includes a piezoelectric element and a pair of electrical connections for connecting said element to a source of energizing signals.

3. A tape drive assembly as set forth in claim 1 wherein said tape pinch means includes a tape contacting disc, a second transducer means attached to said disc to impart physical oscillations thereto and a spring-loaded support means for said pinch means to urge said disc against said tape.

4. A tape drive assembly as set forth in claim 1, wherein said transducer means is a cylindrical piezoelectric shell attached to the interior of said outer shell and said drive means includes a support means for said piezoelectric shell having a low acoustical impedance.

5. A tape drive assembly as set forth in claim 4, wherein said support means is a rigid polyurethane foam.

6. A tape drive assembly as set forth in claim 1, wherein said transducer is arranged to oscillate in a self-resonate mode.

7. A tape drive assembly as set forth in claim 3, and including an energizing means producing an output signal for energizing said transducer means attached to the interior of said shell and said second transducer and gating means operative to selectively apply said output signal from said energizing means.

8. A tape drive assembly as set forth in claim 3, wherein said second transducer means is a piezoelectric element supported on said support means by a material having a low acoustical impedance.

9. A tape drive assembly as set forth in claim 8, wherein said material is a rigid polyurethane foam.

References Cited

UNITED STATES PATENTS

| | | | |
|---|---|---|---|
| 968,702 | 1/1961 | Fay | 226—95 X |
| 3,239,283 | 3/1966 | Broeze et al. | 308—9 |
| 3,333,753 | 8/1967 | Streets | 226—190 X |
| 3,351,393 | 11/1967 | Emmerich | 310—8.2 X |

M. HENSON WOOD, Jr., *Primary Examiner.*

J. P. MULLINS, *Assistant Examiner.*